United States Patent [19]
Everitt

[11] Patent Number: 6,061,396
[45] Date of Patent: May 9, 2000

[54] METHOD AND APPARATUS FOR MODIFIED BAUD RATE SAMPLING

[75] Inventor: James W. Everitt, Granite Bay, Calif.

[73] Assignee: Level One Communications, Inc., Sacramento, Calif.

[21] Appl. No.: 08/933,257

[22] Filed: Sep. 18, 1997

[51] Int. Cl.[7] .................................................. H03H 7/30
[52] U.S. Cl. ........................... 375/233; 375/350; 708/323
[58] Field of Search .................................... 375/232, 233, 375/234, 350; 708/323, 350; 364/724.2; 333/18, 28 R

[56] References Cited

U.S. PATENT DOCUMENTS

| | | | |
|---|---|---|---|
| 5,036,525 | 7/1991 | Wong ........................................ | 375/232 |
| 5,398,259 | 3/1995 | Tsujimoto ................................. | 375/233 |
| 5,490,169 | 2/1996 | Blackwell et al. ....................... | 375/232 |
| 5,586,100 | 12/1996 | Lee et al. ................................. | 369/124 |
| 5,590,160 | 12/1996 | Ostman .................................... | 375/367 |

FOREIGN PATENT DOCUMENTS 0 451 754 A1  10/1991  European Pat. Off. .
35 01 607 A1  7/1986  Germany .

*Primary Examiner*—Stephen Chin
*Assistant Examiner*—Lenny Jiang
*Attorney, Agent, or Firm*—Merchant & Gould P.C.

[57] ABSTRACT

A baud rate sampling receiver, for reducing signal overshoot and improving equalization of a communications channel. The receiver filters an input signal, samples the filter output signal at the baud rate, continuously monitors the filter output signal for overshoot using a latching comparator circuit, and controls filter parameters based upon the sampling and monitoring using a filter control. The latching comparator circuit includes a positive latching threshold comparator circuit and a negative latching threshold comparator circuit. Each of these comparator circuits provides a threshold control bit to the filter control in response to a detection of signal overshoot. While the filter control also receives information about the filtered output signal from a sampling circuit, the threshold control bits indicate to the adaptive filter control immediately, rather than at the next sample point, when signal overshoot is present. The filter control responds by appropriately adjusting filter parameters such as high frequency boost.

16 Claims, 4 Drawing Sheets

METHOD AND APPARATUS FOR MODIFIED BAUD RATE SAMPLING

BACKGROUND OF THE INVENTION

1. Field of the Invention

This invention relates in general to the field of communications channel receivers, and more particularly to an adaptively equalized receiver having a latching comparator circuit to continuously monitor the receiver output signal to improve equalization.

2. Description of Related Art

"Communication" is the exchange of thoughts, opinions, ideas, and information. It is the means to socialize, do business, educate, and entertain. Communication can take many forms, such as spoken words, written letters, or symbols. Although face to face communication is often desirable, it is often not possible due to geographical distance, time constraints, and an ever-increasing need for a high volume of information in today's society. It is for this reason that information, or data, is sent over communications "channels," via "signals."

A communications channel is a single path for transmitting an electrical signal, such as a twisted wire-pair cable, or a fiber optic line. A signal is a physical representation of data, such as the electrical pulses which are used to correspond to digital logic levels.

Signals are sent, or transmitted, in a tremendous variety of forms. For example, signals are used to send voice information over a telephone line; modems use signals to transmit data between computers; signals are constantly sent between the CPU and disk storage device in a personal computer; and signals representing images and sound are transmitted from a television camera on-site, to the television in a viewer's living room that could be thousands of miles away.

Signal distortion or degradation is a significant problem in the field of communications. Any real communications channel has transmission deficiencies, including various kinds of noise and interference, which distort the signal. For example, static noise (caused by natural electric disturbances in the atmosphere) and thermal noise (caused by the random motion of electrons in the channel) are present to some extent in any communications channel. Intersymbol interference (degradation caused by signals in different channels interfering with one another) can also be a major problem, especially given today's high volume of communications activity. In short, there are many reasons why a signal that is sent may be unrecognizable when it is received.

Thus, transmission deficiencies must be corrected so that the signal received is the same as the one that was sent, and valuable information is not lost. This correction can be accomplished by the signal receiver, through a process known as equalization.

Equalization is the process of correcting a channel for its transmission deficiencies, by introducing networks which compensate for attenuation and time delay problems in the signal. A properly equalized communications channel will significantly increase the likelihood of obtaining an accurate signal (i.e., the signal that was sent) at the receiving end of a communications network. An "equalizer" is a device used to accomplish equalization.

A filter can be used as an equalizer. Further, a filter may have a means of monitoring its own frequency response characteristics and a means of varying its own parameters by closed loop action, in order to attain optimal equalization. Such a self-adjusting filter is called an "adaptive filter," and it can be used in a channel receiver to attain "adaptive equalization." The parameters of an adaptive filter are typically adjusted by sampling the filter output at a predetermined rate, and sending this sampled output to some filter control means, which adjusts filter parameters accordingly via closed loop feedback.

However, such a scheme limits adjustment of the filter parameters to information available at the sample points. Any distortions in the signal that occur outside of a sample point will not be corrected until the time the next sample is taken, thus equalization of the channel will not be optimal. This could result in errors in the received signal.

In lower frequency systems such as modems, this problem is addressed by taking multiple samples within the baud period. This is called "fractionally spaced sampling." Fractionally spaced sampling reduces the possibility for signal errors because there is less time between sample points during which the signal is not monitored, and the receiver has more information (i.e., more samples) to use in reconstructing the signal that was sent. The multiple sampling ensures that when signal distortion occurs, the next sample point is never far away and thus the signal will be corrected quickly.

In higher data rate systems such as fast ethernet (e.g. the data rate is 100 Mb/s or more), however, fractionally spaced sampling becomes unrealistic due to high costs and physical limitations of receivers. Thus, higher data rate systems typically sample only once in the baud period; this is called "baud rate sampling."

Furthermore, in baud rate sampling systems, the receiver is usually designed so that sampling occurs at the center of the baud period, in order to minimize the likelihood of incorrectly reading the level of the signal. Nevertheless, baud rate sampling can be more susceptible to errors in reconstruction of the signal since only a single sample is used to determine the value of that signal each baud period.

Thus, it can be seen that there is a need for a receiver that improves equalization of received signals.

It can also be seen that there is a need for a receiver that corrects for channel transmission deficiencies.

SUMMARY OF THE INVENTION

To overcome the limitations in the prior art described above, and to overcome other limitations that will become apparent upon reading and understanding the present specification, the present invention discloses a method and apparatus for modified baud rate sampling.

The present invention solves the above described problems by providing a means for continuously monitoring a filtered signal and preventing it from overshooting predetermined threshold levels. The present invention captures information present between the clocked sample points which is normally not used in baud rate sampling adaptive equalizers, and uses this information to continuously adjust filter parameters. This has the effect of improving equalization.

A system in accordance with the principles of the present invention includes an adaptive filter, a sampling circuit, a clock input, a latching comparator circuit, and a filter control circuit. The adaptive filter provides a filtered output signal in response to an input signal, and the sampling circuit samples this filtered output signal at a rate determined by the clock input. The sampling circuit, in turn, provides an N bit digital output to the filter control circuit, which uses this information to determine how to modify the parameters of the adaptive filter in order to optimize equalization. Additional information is provided to the filter control circuit by the latching comparator circuit, which monitors the signal on a continuous basis, as opposed to sampling, and provides a control bit which indicates whether the filtered output signal has exceeded a predetermined threshold. Thus, signal overshoot is detected by the adaptive filter control immediately, rather than at the next sample point.

One aspect of the present invention is that the latching comparator circuit includes a positive latching comparator circuit and a negative latching comparator circuit, the positive latching threshold comparator circuit providing a "positive threshold control bit" to the filter control and the negative latching threshold comparator circuit providing a "negative threshold control bit" to the filter control.

Another aspect of the present invention is that bit N/2 of the N bit output of the sampling circuit indicates whether the filter output is a positive or negative signal.

Another aspect of the present invention is that bit N/2 is used by the comparator circuit to reset the positive latching comparator circuit when the filter output is negative, and to reset the negative latching comparator circuit when the filter output is positive.

Another aspect of the present invention is that the adaptive filter has input control parameters which are monotonically related to the signal overshoot, which the latching comparator circuit is detecting.

Another aspect of the present invention is that the input control parameters are controlled and adjusted by the filter control.

Another aspect of the present invention is the ability of the filter control to adjust the high frequency boost of the adaptive filter, as well as providing automatic gain control (AGC) to the adaptive filter.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

Figure 1:
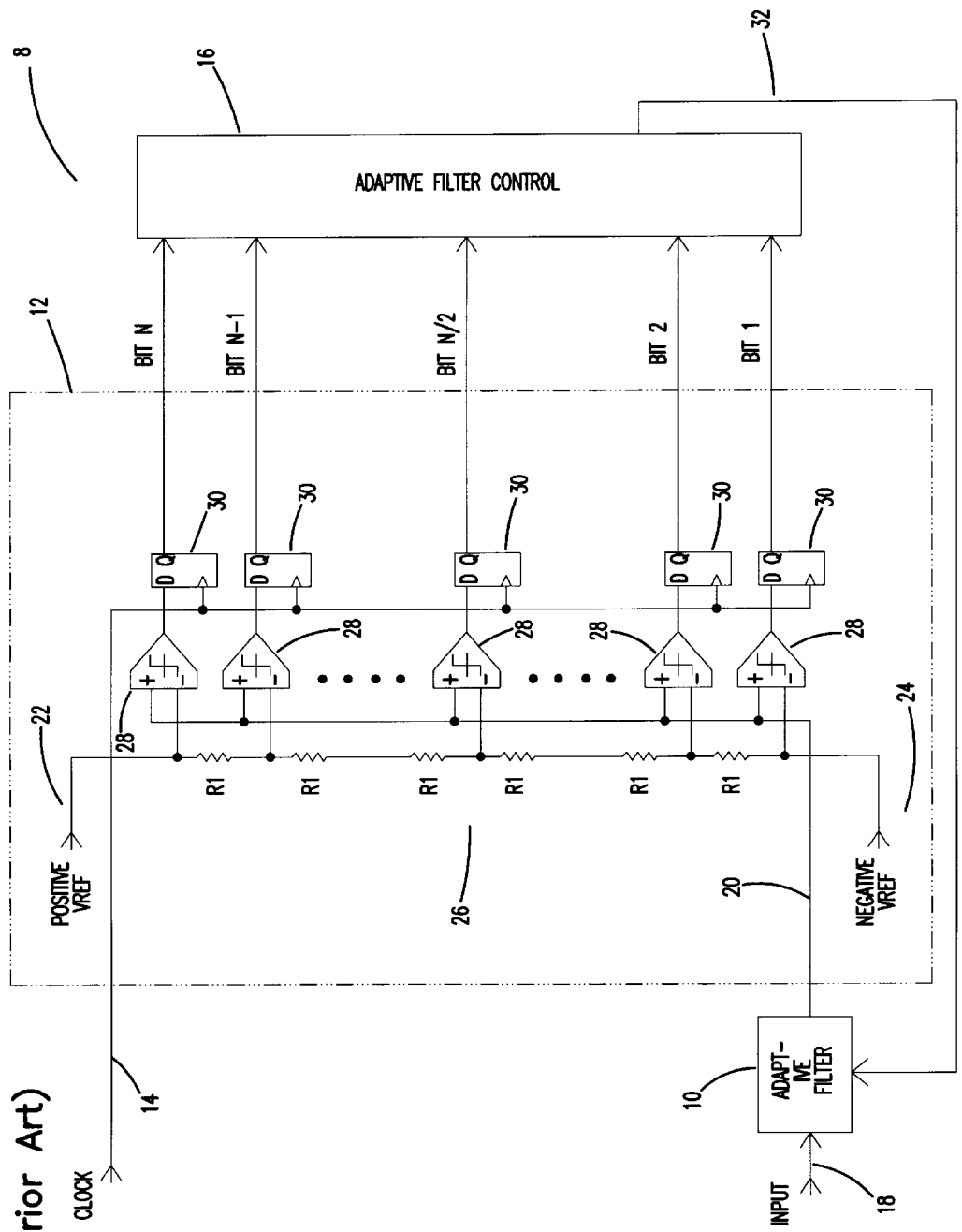
FIG. 1 is an example of an adaptively equalized receiver of the prior art.

Referring now to FIG. 1, a typical adaptively equalized receiver 8 of the prior art is illustrated, comprising an adaptive filter 10 for filtering an input signal, an analog to digital converter 12 for sampling the output of the adaptive filter 10, a clock input 14 for selecting the sample rate of the analog to digital converter 12, and an adaptive filter control 16 for adjusting the parameters of the adaptive filter 10.

A signal transmitted via a communications channel is received by the adaptively equalized receiver at the input 18 to the adaptive filter 10. The adaptive filter 10 typically provides automatic gain control (AGC), as well as increasing the high frequency components of the input signal (i.e. providing "high frequency boost"). However, the adaptive filter 10 may have other properties as well.

The adaptive filter 10 has an output 20 which is coupled to an analog to digital converter 12. Thus, after an input signal from a communications channel passes through the adaptive filter 10, a filtered output signal will be sampled by the analog to digital converter 12.

The analog to digital converter 12 comprises a voltage divider circuit, which in turn comprises a positive reference source 22, negative reference source 24, a plurality of resistors 26, a plurality of comparators 28, a plurality of flip flops 30, and a clock 14. The analog to digital converter 12 functions as follows.

The adaptive filter 10 is coupled to the plurality of comparators 28, so that the filtered output signal from the adaptive filter 10 is compared to the various reference voltages established by the voltage divider circuit, and a plurality of outputs are produced by the plurality of comparators 28. Each of the comparators 28 is coupled to one of the plurality of flip flops 30, which store the output signal from the plurality of comparators 28. All of the flip flops 30, in turn, are coupled to the clock 14. Thus, the plurality of flip flops 30 sample the outputs of the plurality of comparators 28 at the rate determined by the clock 14.

The output of each of the plurality of flip flops 30 is coupled to the adaptive filter control 16 for adjusting the parameters of the adaptive filter 10. The adaptive filter control 16 is coupled via closed loop feedback to the adaptive filter 10. Thus, the adaptive filter control 16 takes as input the N bit digital output of the analog to digital converter 12, and sends as an output 32 (to the adaptive filter 10) a signal that will change parameters of the adaptive filter 10, in order to optimize equalization.

The problem with the above described circuit 8 of the prior art depicted in FIG. 1 is that, while perhaps adequate for some slower data rate systems in which fractionally spaced sampling can be used, the above described circuit 8 does not do an adequate job of equalization in baud rate sampled systems. When using the circuit 8 of the prior art in baud rate sampled systems, no information about the signal is available to the filter control 16 at any time during the baud period other than the time at which the sample is taken. If, in the circuit 8 of FIG. 1 for example, the adaptive filter 10 applies too much high frequency boost to the input signal 18, causing the filter output signal 20 to overshoot its predetermined threshold, the filter parameters will not be appropriately adjusted to correct such overshoot until the next sample is taken, and in the intervening time an error in signal reconstruction may occur.

Figure 2:
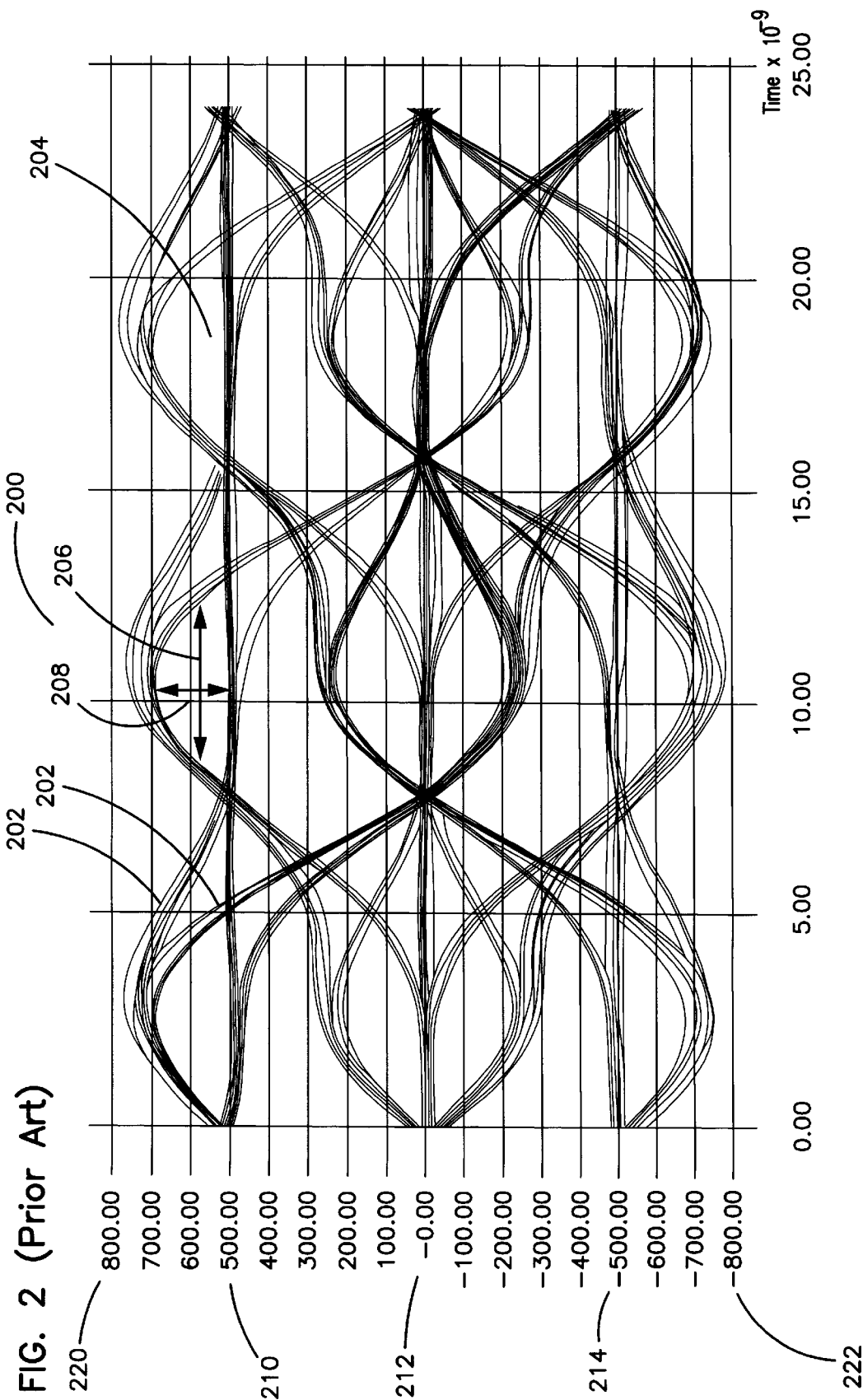
FIG. 2 is an eye diagram of an equalized signal such as would be produced by the adaptively equalized receiver.

The aforementioned problem is illustrated in FIG. 2 using an eye diagram 200. The effectiveness of an equalizer in correcting a channel (so an accurate representation of the original signal is received) may be illustrated using the eye diagram 200. The eye diagram 200 is formed by overlaying successive time intervals 202 of a time domain waveform onto a single graph, much as would be done with a common storage oscilloscope. After filtering, the eye diagram 200 shows overlapping waveforms 202, and if the filter has reconstructed the signal well, the overlapping waveforms resemble an eye 204, as seen in FIG. 2.

There are two features shown in FIG. 2 which are analyzed to determine the effectiveness of an equalizer. First, it can be seen that each eye 204 has a horizontal opening 206. A wide eye lessens the likelihood that "jitter-induced errors" (short-term variations of the significant instants of a digital signal from their ideal position in time) and other problems of time shifting will cause an error during reconstruction of the signal by the receiver. If, for example, a sample is taken at a time slightly off from the center of a baud period of the signal of FIG. 2, the sample may not provide an accurate value of that signal if the eye is narrow as shown here.

Second, each eye 204 of FIG. 2 has a vertical opening 208. A receiver has a threshold detect level, at which any reading above this level indicates a certain logic level, and any reading below this level indicates a different logic level. An eye 204 which is not opened wide vertically indicates that the receiver is more likely to allow noise or slight errors in the threshold detect level to affect signal reconstruction because the level of the signal will typically be near from the threshold level at the sampling times.

The eye diagram 200 of FIG. 2 represents an output signal from the receiver of FIG. 1, with the receiver of FIG. 1 sampling at the baud rate. It can be seen in FIG. 2 that the signal represented by the eye diagram 200 is a three-level code 210, 212, 214, and has overshot its positive threshold of 0.5 volts 210, as well as its negative threshold of −0.5 volts 214; the signal depicted in this eye diagram 200 reaches levels of nearly −0.8 volts 220 and −0.8 volts 222. This overshoot may be caused by the adaptive filter applying too much high frequency boost to the signal.

As mentioned above, it can also be seen in FIG. 2 that if a sample of the signal depicted by the eye diagram 200 is taken at a time slightly off from the center of the baud period, the sample may give an erroneous value for the signal for that baud period. As FIG. 2 shows, the horizontal opening 206 of each eye 204 is very narrow, which means that the signal does not necessarily hold its value for a long time and a slight departure from ideal sample time may yield the wrong signal value.

Likewise, the vertical openings 208 of each eye 204 are important as well. Assume the voltage thresholds for the three-level coded signal 210, 212, 214 depicted in FIG. 2 are set at 0.25 v and −0.25 v (i.e. a signal value above 0.25 v is deemed to be a plus one level, a signal value below −0.25 v is deemed to be a minus one level, and a signal value between −0.25 and 0.25 v is deemed to be a zero level). It can be seen in FIG. 2 that a slight departure from the ideal voltage thresholds could result in a sample yielding an erroneous signal value.

Referring again to FIG. 1, better equalization of the input signal 18 can be attained if the output signal 20 from the adaptive filter 10 is not allowed to overshoot its threshold values. The difficulty in preventing signal overshoot in baud rate sampling, though, is that while overshoot can be detected and corrected for by adjusting filter parameters at the (one) time during the baud period at which a sample is taken, the signal is unmonitored during the remaining portion of the baud period, and overshoot which occurs during this time remains undetected until the next sample is taken (during the next baud period). If there were a means in a baud rate sampling receiver to continuously monitor the adaptive filter 10 output signal 20 for overshoot and to prevent such overshoot, the receiver 8 would be able to attain a more accurate reconstruction of the signal 18 which was sent.

The present invention provides such a means for continuously monitoring an equalized signal and preventing it from overshooting predetermined threshold levels. The present invention captures information present between the clocked sample points which is normally not used in baud rate sampling adaptive equalizers, and uses this information to continuously adjust the equalization process.

Figure 3:
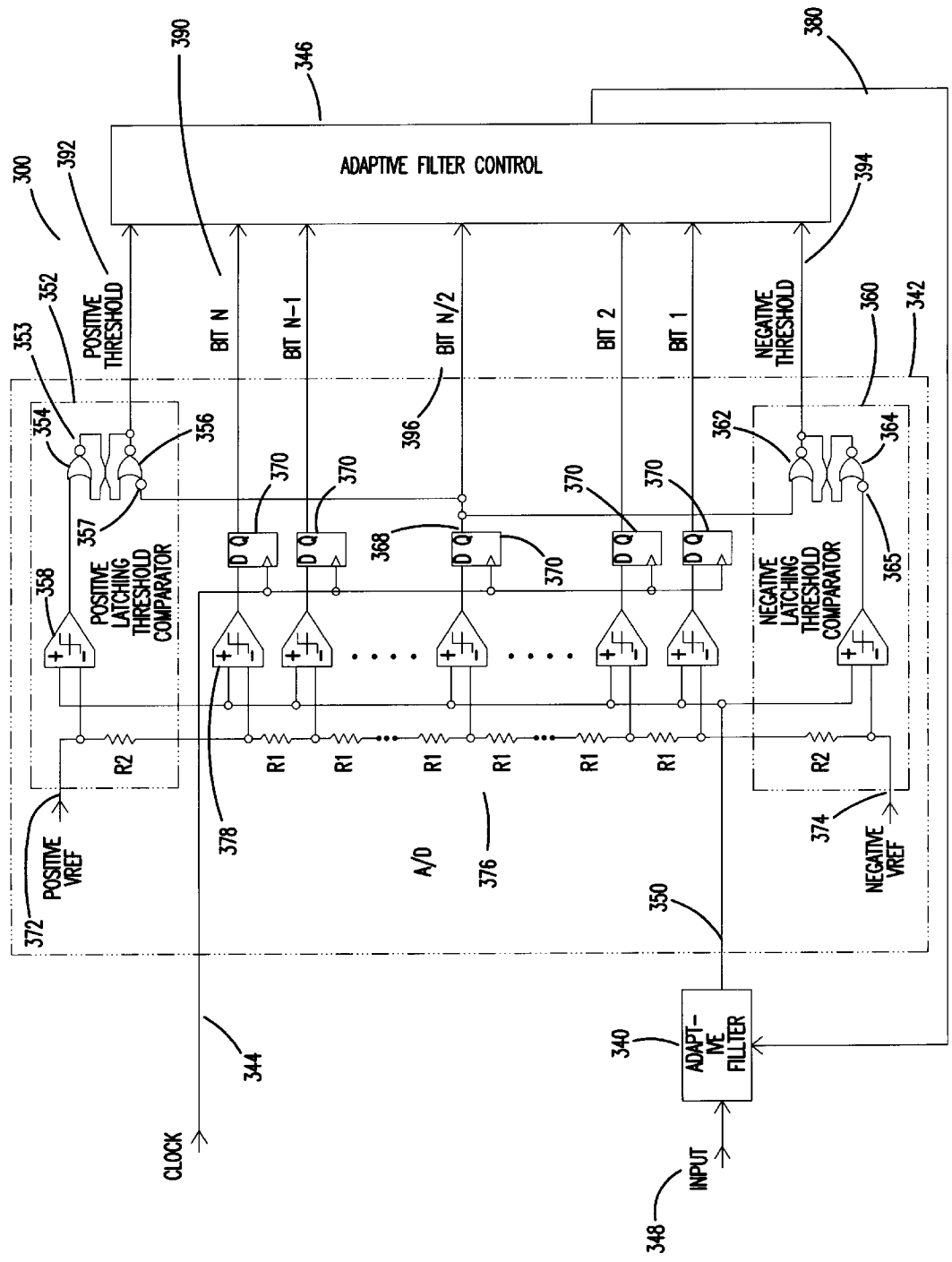
FIG. 3 is a receiver exemplifying the present invention, featuring positive and negative threshold comparators, which are latching rather than sampled, and continuously monitor and detect when a signal exceeds predetermined thresholds.

FIG. 3 illustrates an exemplary "modified" baud rate sampling adaptive equalizer 300 according to the present invention. It comprises an adaptive filter 340 for filtering an input signal coming from a communications channel, an analog to digital converter 342 for sampling the output of the adaptive filter 340, a clock input 344 for selecting the sample rate of the analog to digital converter 342, a positive latching threshold comparator circuit 352 for detecting when the output of the adaptive filter 340 overshoots a predetermined positive threshold, a negative latching threshold comparator circuit 360 for detecting when the output of the adaptive filter 340 overshoots a predetermined negative threshold, and an adaptive filter control 346 for adjusting the parameters of the adaptive filter 340 in response to information received from the analog to digital converter 342, the positive latching threshold comparator circuit 352, and the negative latching threshold comparator circuit 360.

In the circuit 300 of FIG. 3, a signal transmitted via a communications channel is received at the input 348 to the adaptive filter 340. The adaptive filter 340 could apply automatic gain control, high frequency boost, or other adjustments to the input signal 348. The filter parameters are controlled by an adaptive filter control 346, which is coupled to the adaptive filter 340 via closed loop feedback 380.

Just as illustrated in the prior art circuit of FIG. 1, the output 350 of the adaptive filter 340 is coupled to an analog to digital converter 342, which samples the signal at a rate determined by the clock 344 and provides an N bit digital output 390. This N bit digital output 390 is one source of information used by adaptive filter control 346 to determine how the adaptive filter parameters should be modified in order to obtain an optimum filter output signal 350.

However, unlike the baud rate sampling circuits of the prior art illustrated in FIG. 1, the circuit 300 of FIG. 3 also includes comparator circuits 352 and 360. Comparator circuits 352 and 360 are latching rather than clocked, and therefore can detect signal overshoot at times outside the normal sampling points of the signal, for example, when the rate of data entering the adaptive filter 340 is 100 Mb/s or more.

Both of the comparator circuits 352 and 360 have an output which is coupled to the adaptive filter control 346. Positive latching comparator circuit 352 provides the adaptive filter control 346 with a "positive threshold control bit" 392 which indicates whether the filtered output signal 350 has exceeded a predetermined positive threshold. Negative latching threshold comparator circuit 360 provides the adaptive filter control 346 with a "negative threshold control bit"

394 which indicates whether the filtered output signal 350 has exceeded a predetermined negative threshold. These threshold control bits 392, 394 are used by the adaptive filter control 346, along with the N bit control word 390 provided by the analog to digital converter 342, in determining how to adjust the parameters of the adaptive filter 340. However, because the comparator circuits 352 and 360 are latching rather than clocked, the adaptive filter control 346 will be capable of immediately adjusting filter parameters in response to signal overshoot, instead of waiting until the next sample period to receive this information.

Positive latching threshold comparator circuit 352 comprises positive reference voltage source 372, comparator 358, logic NOR gates 354 and 356, and inverter 357. Logic NOR gates 354 and 356 and inverter 357 function together as a latch 353 the output of which will be a logic low signal as long as the filter output signal 350 remains at an amplitude less than the predetermined positive threshold; the latch output signal strobes high when the filter output signal 350 surpasses the predetermined positive threshold.

The latch 353 utilizes two inputs to accomplish the above described "threshold detect" function. First, output 368 from the "middle" one of the plurality of flip flops 370 (which is coupled to the "middle" one of the plurality of comparators 378) in the analog to digital converter 342, is coupled to inverter 357, which in turn is coupled to an input to NOR gate 356. Flip flop output 368 transmits bit N/2 396 of the N bit output 390 from the analog to digital converter 342. Bit N/2 396 indicates whether the filter output signal is positive or negative. If the filter output signal is negative, then bit N/2 396 transmitted to inverter 357 will be a logic zero, causing the positive latching threshold comparator circuit 352 to output a logic low signal.

The second input to the latch 353 is delivered by comparator 358, which compares the voltage of positive reference 372 with the filter output signal. The output of comparator 358 is coupled to an input of logic NOR gate 354, and if the filter output signal is less than the predetermined reference voltage, the low signal output from comparator 358 will cause the positive latching comparator circuit 352 to output a logic low signal.

If the inputs to positive latching comparator circuit 352 indicate that, first, the filter output signal is positive, and second, that it exceeds the predetermined threshold voltage, then the output of the positive latching threshold comparator circuit 352 will be a logic high signal. This signal will indicate to the adaptive filter control 346 that it should adjust the parameters of the adaptive filter accordingly, to cause the filter output signal to fall within its predetermined thresholds.

The negative latching threshold comparator circuit 360 works in a manner analogous to the positive threshold comparator circuit 352, except that it outputs a logic high signal when the value of the filter output signal falls below a predetermined negative threshold.

Figure 4:
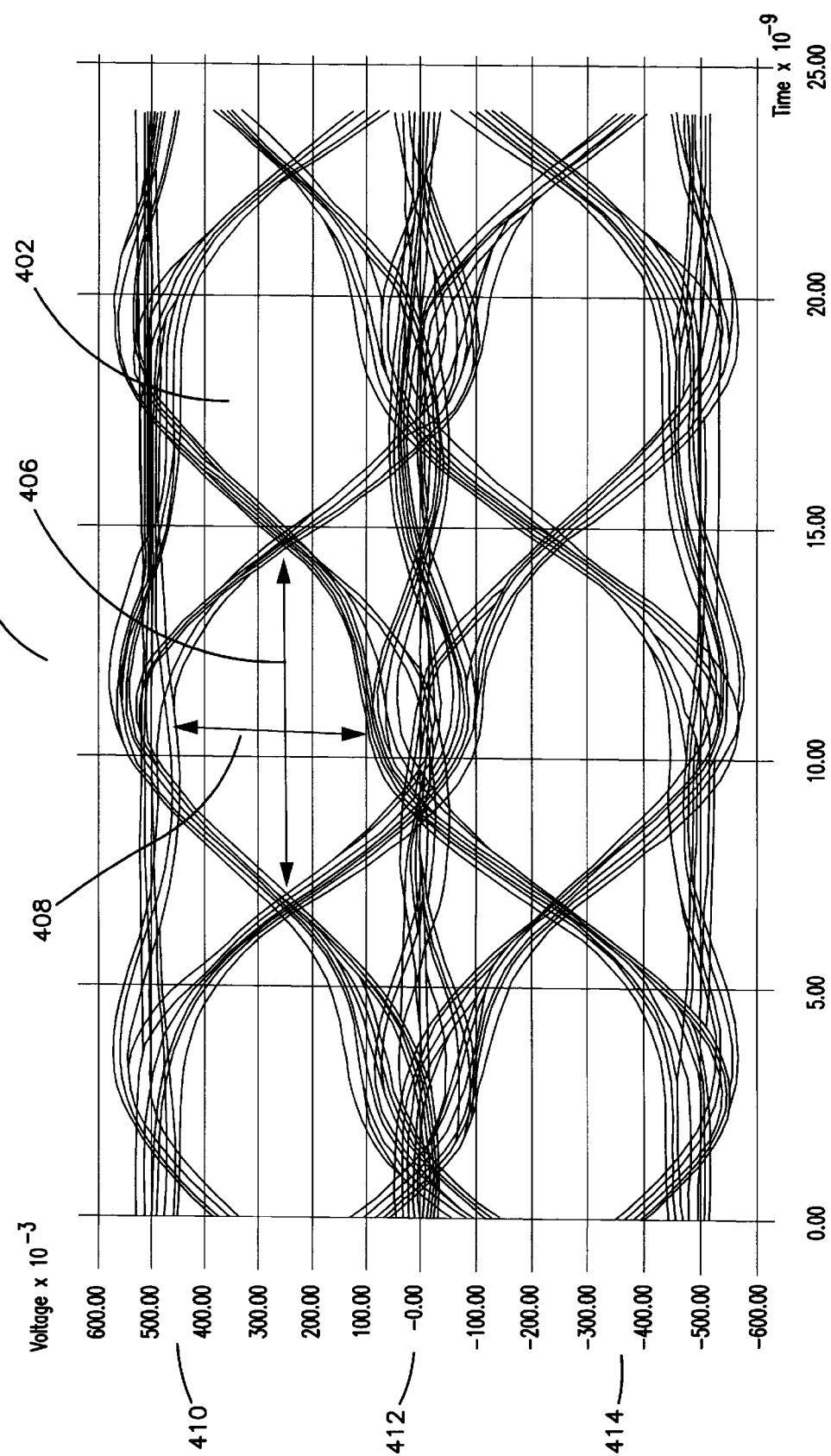
FIG. 4 is an eye diagram for a signal such as would be produced by the adaptively equalized receiver of FIG. 3.

The effectiveness of the circuit 300 of FIG. 3 can be shown using an eye diagram. FIG. 4 depicts an eye diagram 400 for a three level coded signal 410, 412, 414 received by the circuit of FIG. 3; note, however, that the effectiveness of the present invention is not limited to receiving three level coded signals. Unlike the eye diagram of FIG. 2, in which signal overshoot was present and was manifested in the narrow "eye openings", the eye diagram 400 of FIG. 4 depicts a signal which has little if any overshoot, and eye openings 402 which are quite wide horizontally 406 and vertically 408. Such wide eye openings indicate that even if the signal is sampled slightly off in time, or if the voltage threshold slightly departs from the optimal level, accurate signal reconstruction can still occur. As illustrated in FIG. 4, the signal holds at clearly defined logic levels for a longer time (than, for example, the signal of FIG. 2), and the logic levels are more clearly separated in value.

So, comparing the eye diagrams 200, 400 of FIG. 2 and FIG. 4 respectively shows that the circuit 300 of FIG. 3 significantly improves equalization over the prior art.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An adaptively equalized receiver, comprising:
    an adaptive filter for providing a filtered output signal in response to an input signal;
    a sampling circuit, coupled to said adaptive filter, for sampling said filtered output signal at a selectable sample rate to provide an N bit control word;
    a clock input, coupled to said sampling circuit, for controlling said selectable sample rate of said sampling circuit;
    a latching comparator circuit, coupled to said adaptive filter, for monitoring said output signal to determine when said output signal exceeds a predetermined threshold and providing a threshold control bit in response thereto; and
    a filter control circuit, coupled to said sampling circuit, for providing a control parameter to said adaptive filter in response to said N bit control word and said threshold control bit.

2. The receiver of claim 1 wherein said latching comparator circuit monitors said input signal continuously.

3. The receiver of claim 1 wherein said input signal comprises a three-level code.

4. The receiver of claim 1, wherein the rate of data entering said adaptive filter is at least 100 Mb/s.

5. The receiver of claim 1 wherein said latching comparator circuit comprises a positive latching comparator circuit and a negative latching comparator circuit, said positive latching comparator circuit determining when said output signal exceeds a predetermined positive threshold and providing a positive threshold control bit in response thereto, and said negative latching comparator circuit determining when said output signal exceeds a predetermined negative threshold and providing a negative threshold control bit in response thereto.

6. The receiver of claim 5 wherein said positive latching comparator circuit further comprises a reset circuit for resetting said positive latching comparator in response to said output signal being less than zero volts.

7. The receiver of claim 6, wherein said N bit control word provided by said sampling circuit includes a bit which indicates whether said output signal is positive or negative, and said bit is provided to said reset circuit for resetting said positive latching comparator.

8. The receiver of claim 5 wherein said negative latching comparator circuit further comprises a reset circuit for resetting said negative latching comparator in response to said input signal being greater than zero volts.

9. The receiver of claim 8, wherein said N bit control word provided by said sampling circuit includes a bit which indicates whether said output signal is positive or negative, and said bit is provided to said reset circuit for resetting said negative latching comparator.

10. The receiver of claim 5 wherein said adaptive filter further comprises automatic gain control having a high frequency component, said high frequency component being varied in response to said latching comparator circuit determining that said output signal exceeds said predetermined positive or negative threshold.

11. The receiver of claim 10 wherein said varying of the high frequency component is monotonically related to the amount by which said input signal exceeds said predetermined positive or negative threshold.

12. The receiver of claim 1 wherein said sampling circuit comprises:

a voltage divider circuit for providing a plurality of reference signals;

a plurality of comparators, each coupled to one of said reference signals and said input signal, each for comparing said input signal to one of said reference signals, and each providing an output bit in response thereto; and a plurality of flip flops, each coupled to one of said output bits and said clock input, for changing the value of said N bit control word to said adaptive filter control only when said clock input causes a sample to be taken.

13. A method of adaptively equalizing an input signal to an adaptive filter, comprising the steps of:

adaptively filtering the input signal, to provide a filtered output signal;

sampling said output signal at a selectable sample rate to provide an N bit control word;

controlling said selectable sample rate with a clock;

continuously monitoring said output signal, to determine when said output signal exceeds a predetermined threshold, and providing a threshold control bit in response thereto; and providing a control parameter to said adaptive filter in response to said N bit control word and said threshold control bit.

14. The method of claim 13 wherein the step of continuously monitoring said output signal comprises the steps of:

determining when said output signal exceeds a predetermined positive threshold and providing a positive threshold control bit in response thereto; and determining when said output signal exceeds a predetermined negative threshold and providing a negative threshold control bit in response thereto.

15. The method of claim 14 wherein the step of continuously monitoring said output further comprises the steps of:

resetting a positive threshold comparator circuit in response to said output signal being less than zero volts; and resetting a negative threshold comparator circuit in response to said output signal being greater than zero volts.

16. The method of claim 13, wherein the step of sampling said filtered output signal at a selectable sample rate comprises the steps of:

comparing said output signal to N reference signals, and providing said N bit control word in response thereto; and changing the value of said N bit control word only when said filtered output signal is sampled.

* * * * *